US006269973B1

(12) United States Patent
Bennett et al.

(10) Patent No.: US 6,269,973 B1
(45) Date of Patent: *Aug. 7, 2001

(54) BEVERAGE MIXING SYSTEM

(75) Inventors: Charles E. Bennett, Sacramento; Antonio J. Jepson, Dixon, both of CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,281

(22) Filed: Oct. 13, 1999

(51) Int. Cl.[7] ........................................... G01F 11/00
(52) U.S. Cl. ..................... 222/1; 222/64; 222/129.1; 222/146.6
(58) Field of Search ................. 222/1, 64, 129.1–129.4, 222/146.6

(56) References Cited

U.S. PATENT DOCUMENTS

| | | | |
|---|---|---|---|
| 3,730,500 | * | 5/1973 | Richards ........................... 222/146.6 |
| 4,795,061 | * | 1/1989 | Peckjian ............................. 222/129.2 |
| 5,033,645 | * | 7/1991 | Shannon et al. ................... 222/146.6 |
| 5,588,558 | * | 12/1996 | Cox et al. ............................... 222/64 |
| 5,673,820 | * | 10/1997 | Green et al. ....................... 222/129.3 |
| 6,112,946 | * | 9/2000 | Bennett et al. ........................ 222/64 |

FOREIGN PATENT DOCUMENTS

2027426 * 4/1992 (CA) ................................. 222/146.6

* cited by examiner

Primary Examiner—Joseph A. Kaufman
(74) Attorney, Agent, or Firm—Townsend and Townsend and Crew LLP

(57) ABSTRACT

This invention provides a system and a method of mixing and dispensing a beverage from a beverage concentrate. The flow of the beverage concentrate into a mixing device for mixing water with the beverage concentrate is monitored to detect a low flow situation indicating the need to replace the beverage concentrate supply bag. The system automatically controls the flow of mixed beverage out of the mixing device in response to the detected flow of beverage concentrate. In a specific embodiment, a pressure switch is provided to monitor the pressure of the flow of beverage concentrate into the mixing device. When the pressure sensed by the pressure switch falls below a preset minimum pressure, the pressure switch activates a flow regulating device coupled to the outlet of the mixing device to shut off the flow of beverage from the mixing device. This prevents or minimizes the dispensing of beverages of improper mix ratios from the mixing device. After the beverage concentrate supply bag is replaced, the pressure in the flow of concentrate will build. When the pressure switch senses a pressure that rises to or above the preset minimum pressure, it automatically opens the flow regulating device to the flow of beverage out of the mixing device.

19 Claims, 3 Drawing Sheets

BEVERAGE MIXING SYSTEM

BACKGROUND OF THE INVENTION

This invention relates generally to mixing and dispensing beverages and, more particularly, to a system for automatically shutting down the dispensing operation when an improper mixing is detected. The present invention has broad applications, but is particularly advantageous for systems that dispense frozen beverages. For purposes of this discussion, the term "frozen beverage" is used to refer to a beverage that is at least partially frozen.

Heretofore, when it was desired to provide a frozen beverage, the beverage was poured into a dispensing container and cooled using a refrigeration unit which maintains the frozen beverage in a desired consistency at a particular temperature. When it is necessary to refill the container, additional beverage is poured into the container and cooled for a period of time before dispensing can resume. Conventional systems for producing frozen beverages were labor-intensive and could not continuously provide frozen beverages. Thus, there is a need for a more efficient and inexpensive system for dispensing frozen beverages.

Moreover, a beverage is typically produced by mixing a beverage concentrate with water in a mixing device. The beverage concentrate generally comes in a bag or a container that requires periodic replacement. Proper mixing of the concentrate and water is necessary to produce a beverage of the correct consistency. Improper mixing not only results in an undesirable beverage consistency, but can also lead to equipment damage. One example is when the beverage concentrate runs out on a bag so that the mixed beverage contains more water than desired. If the water content in the beverage reaches an unacceptable level and the beverage is fed into a cooling unit for producing a frozen beverage, the beverage can freeze into a solid block due to the high water content and destroy the cooling unit. Therefore, there is a need for a system for monitoring the flow of the beverage concentrate into the mixing device to detect the need to replace the bag of concentrate and automatically regulating the flow of the mixed beverage in response to the monitored flow of the beverage concentrate.

SUMMARY OF THE INVENTION

The present invention relates to an improved system for preparing a beverage from a beverage concentrate. The invention provides for monitoring the flow of the beverage concentrate into a mixing device to detect a low flow situation indicating the need to replace the concentrate supply bag, and automatically controlling the flow of mixed beverage out of the mixing device in response to the detected flow of beverage concentrate. In a specific embodiment, a pressure switch is provided to monitor the pressure of the flow of beverage concentrate. When the pressure sensed by the pressure switch falls below a preset minimum pressure, the pressure switch activates a flow regulating device coupled to the outlet of the mixing device to shut off the flow of beverage from the mixing device. After the beverage concentrate supply bag is replaced, the pressure in the flow of concentrate will build. When the pressure switch senses a pressure that rises to or above the preset minimum pressure, it automatically opens the flow regulating device to the flow of beverage out of the mixing device. In this way, the system prevents or minimizes dispensing beverages of improper mix ratios and the associated problems.

In one specific aspect of the invention, the beverage produced from the mixing device is fed into a cooling system for efficiently and economically delivering frozen beverages within a desired range of consistency in a continuous manner suitable for large-scale high-volume usage. The cooling system provides for automatically filling a container for providing frozen beverage to avoid the need to interrupt operation of the dispensing system for refilling and to eliminate down time. The level of the beverage in the container is monitored. A controller controls the flow of the beverage into the container in response to the monitored level of the beverage. To prevent flowing the beverage to the container at an unacceptably high rate that would ruin the consistency of the frozen beverage, the flow rate or fill rate is kept below a maximum allowable flow rate which is determined by the cooling or freezing capacity of the cooling unit used to freeze the beverage in the container as well as the ambient temperature. Empirical data are obtained to provide maximum allowable flow rates for different cooling capacity values and ambient temperatures. The cooling system can be tuned based on the empirical data. The cooling system, when properly tuned to match the freezing capacity with the fill rate, will maintain the desired consistency of frozen beverage, while automatically refilling the beverage container to within a desired range of levels.

In accordance with an embodiment of the present invention, a system for preparing a beverage from a beverage concentrate comprises a mixing device. The mixing device has a beverage concentrate inlet coupled with a beverage concentrate line for receiving a beverage concentrate, a water inlet coupled with a water line for receiving water, and an outlet. The mixing device mixes the beverage concentrate and the water to produce a beverage for dispensing through the outlet. A flow regulating device is coupled to the outlet of the mixing device to regulate the flow of the beverage from the mixing device. A pressure switch is coupled to the beverage concentrate line for sensing a pressure in the beverage concentrate line. The pressure switch is coupled with the flow regulating device for closing the flow regulating device to the flow of beverage from the mixing device when the sensed pressure in the beverage concentrate line falls below a preset minimum pressure.

Another embodiment of the invention is a system for mixing and dispensing a beverage which comprises a mixing device. The mixing device has a beverage concentrate inlet coupled with a beverage concentrate line for receiving a beverage concentrate, a fluid inlet coupled with a fluid line for receiving a diluting fluid, and an outlet. The mixing device mixes the beverage concentrate and the diluting fluid to produce a beverage for dispensing through the outlet. A cooling unit is coupled with the outlet of the mixing device for receiving the beverage and cooling the beverage to at least partially freeze the beverage received therein. The system further comprises means for sensing a pressure in the beverage concentrate line and shutting off the flow of the beverage from the outlet to the cooling unit when the pressure in the beverage concentrate line falls below a preset minimum pressure.

Yet another embodiment of the invention is a method of automatically controlling the flow of a beverage produced in a mixing device. The method comprises the step of directing a flow of a beverage concentrate and a flow of water to the mixing device to be mixed therein to produce a mixed beverage for dispensing therefrom. A pressure of the beverage concentrate in the flow of the beverage concentrate to the mixing device is monitored. The flow of the mixed beverage out from the mixing device is regulated in response to the monitored pressure of the beverage concentrate.

BRIEF DESCRIPTION OF THE DRAWINGS

The specific embodiments of this invention, illustrating all their features, will now be discussed in detail. These embodiments depict the novel and nonobvious beverage mixing system of this invention shown in the accompanying drawings, which are included for illustrative purposes only. These drawings include the following figures, with like numerals indicating like parts.

DESCRIPTION OF THE SPECIFIC EMBODIMENTS

Figure 1:
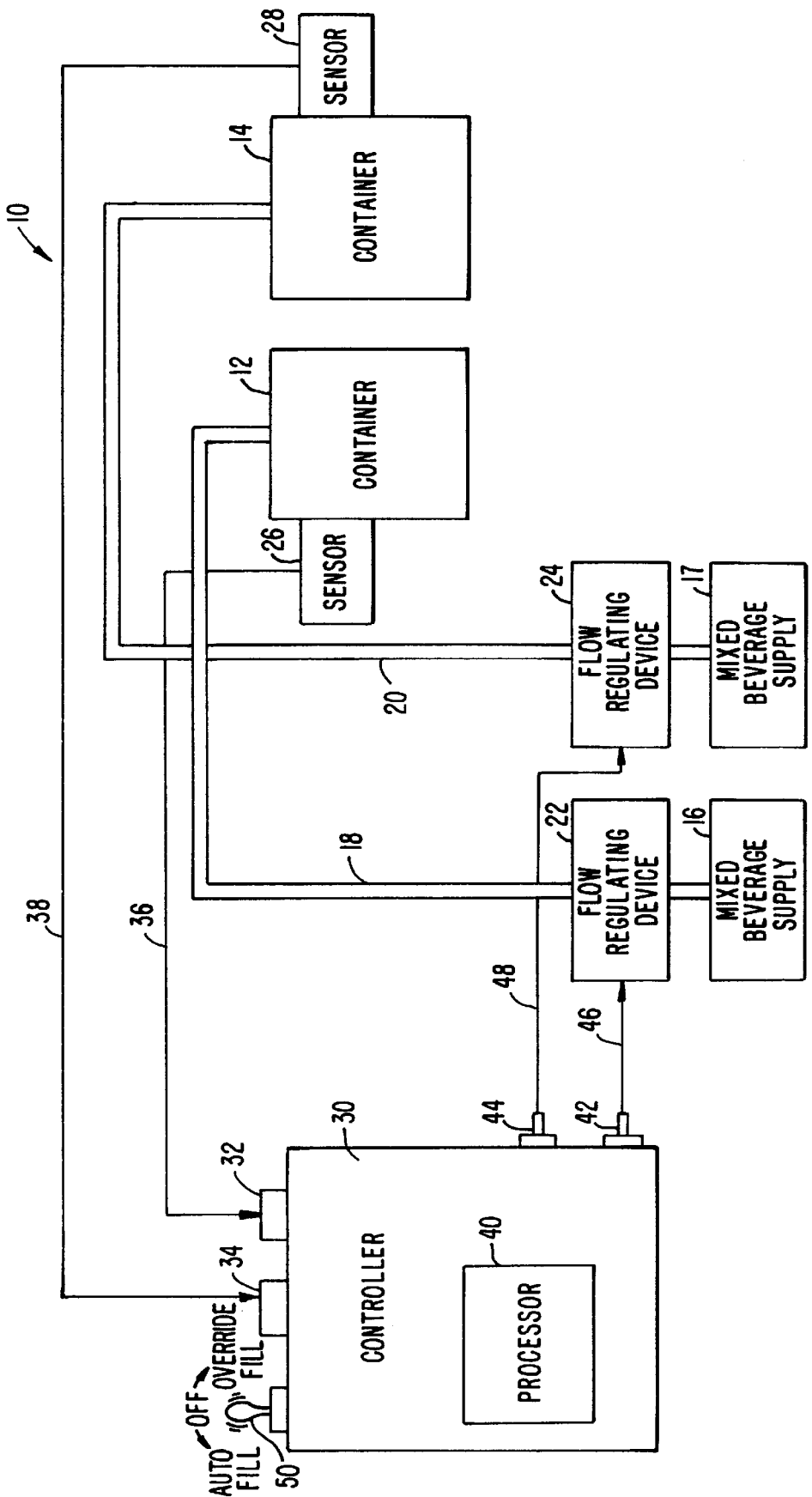
FIG. 1 is a block diagram schematically illustrating an autofill system in accordance with an embodiment of the present invention.

FIG. 1 schematically illustrates a system 10 for filling containers 12, 14 with beverages from a source or supply 16. The system can be used for filling fewer or more containers from more than one beverage source. The beverages are delivered to the containers 12, 14 via delivery lines 18, 20 using one or more pumps (not shown) which are disposed upstream or downstream of the beverage source 16. Flow regulating devices 22, 24 are desirably provided in the delivery lines 18, 20 for regulating the flow rate of the beverages. Examples of suitable flow regulating devices include mass flow regulators, valves, switches, solenoids, and the like. Sensors 26, 28 are provided for monitoring or sensing the level of beverages in the containers 12, 14. The beverage supply 16 may include a brix-mixing manifold for mixing beverage concentrates and water (not shown).

The system 10 includes a controller 30 for controlling the flow of the beverages to the containers 12, 14. The controller 30 has two sensor input ports 32, 34 connected with the sensors 26, 28 via signal cables or lines 36, 38 for receiving sensor signals from the sensors 26, 28. A processor 40 such as a microprocessor in the controller 30 processes the beverage level data contained in the sensor signals. The controller 30 has two control output ports 42, 44 which are connected via control lines 46, 48 with the flow regulating devices 22, 24 for the two delivery lines 18, 20. The processor 40 controls operation of the flow regulating devices 22, 24 via the control lines 46, 48. The controller 30 includes a mode switch 50 having an OFF position, an AUTO mode position, and a PUMP mode position. The controller 30 may comprise a personal computer or the like, and is connected to a power supply (not shown).

Figure 2:
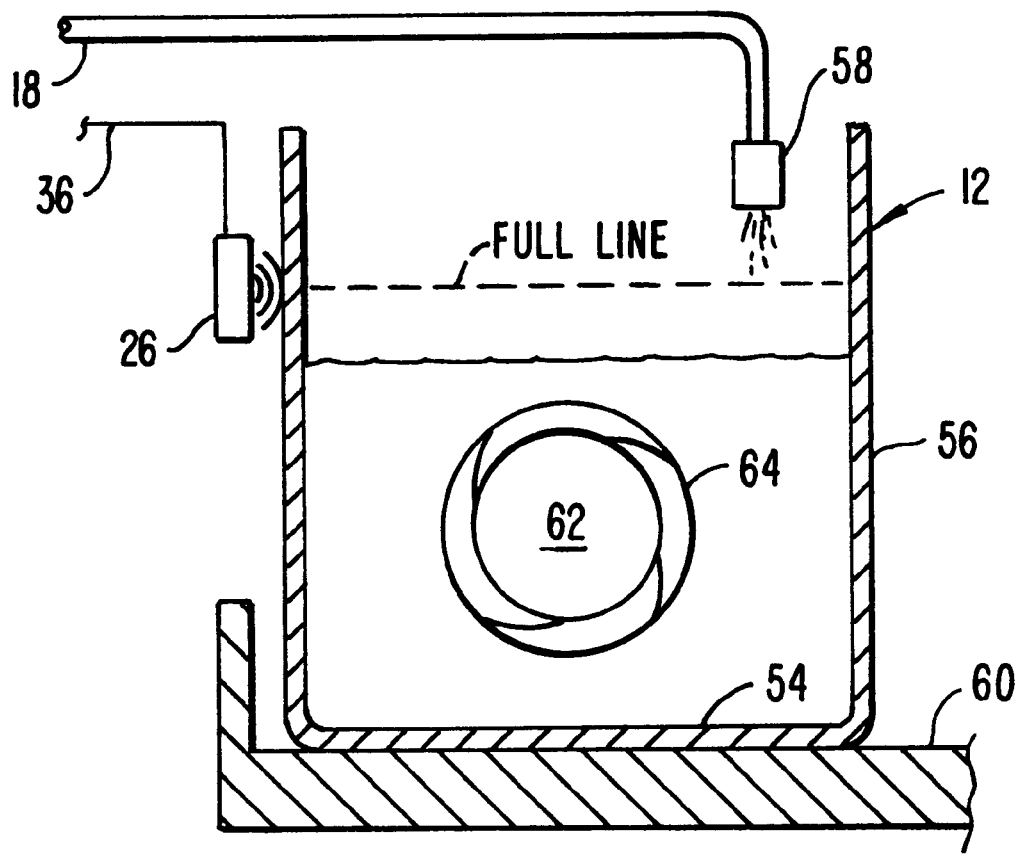
FIG. 2 is a sectional view of a container for providing at least partially frozen beverage in accordance with an embodiment of the present invention.

An exemplary embodiment of the container 12 is shown in FIG. 2. The container 14 may be identical to the container 12. The container 12 has a generally cylindrical shape with a bottom 54 and a side wall 56. The container 12 may be made of a variety of materials, including metals and plastics. One embodiment of the container 12 is made of a transparent plastic material. A filler spigot or fitting 58 is desirably connected with the container 12 to which the delivery line 18 is releasably coupled for discharging the beverage into the container 12. The filler spigot 58 positions the delivery line 18 for delivering the beverage during use, and allows the delivery line 18 to be conveniently disconnected for cleaning and maintenance. The container 12 has a cover (not shown) which encloses the container interior.

A cooling unit or device 60 cools the beverage in the container 12 to an at least partially frozen state. The cooling device 60 includes a heat transfer unit or drum 62 disposed in the container 12. The unit 62 has a generally circular shape, but may have other shapes. The heat transfer unit 62 has a flow of coolant or refrigerant therein which is chilled using any known refrigeration process known in the art (not shown). When the heat transfer unit 62 comes in contact with the beverage, heat is transferred from the beverage to the unit 62. In order to ensure uniformity and consistency of the beverage in the container 12 and to avoid buildup of frozen beverage on the external surface of the heat transfer unit 62, a stirring or agitation unit 64 is preferably provided to stir the beverage. The stirring unit 64 is desirably configured to contact at least a portion of the external surface of the heat transfer unit 62 to scrape off any buildup of frozen beverage to ensure efficient heat transfer operation between the unit 62 and the beverage. In this embodiment, the stirring unit 64 is a stirring spindle that rotates relative to the external surface of the heat transfer unit 62. A single cooling device 60 may be configured to accommodate multiple containers. An example of a cooling device 60 of this type is the ICE TWISTER, ICE DREAM 2, available from SPM Catering, s.r.l. of Spilamberto, Italy.

The sensor 26 is a level sensor which is coupled to the container 12. In this embodiment, the container 12 has a transparent side wall 56 and the sensor 26 is connected to the outside of the side wall 56. The sensor 26 in this embodiment is a proximity sensor which operates on electronic capacitance through the transparent side wall 56 of the container 12 for sensing the beverage level. An example of a suitable sensor is the Pepperl+Fuchs sensors. Of course, other types of sensors can be used. The external sensor of the type shown is advantageous because it can be easily connected to and disconnected from the container, and does not contaminate the interior of the container 12. Further, the sensor 26 is easily connected to the exterior of the container 12 using a suction cup (not shown) or the like which does not require complex mounting hardware and does not cause damage to the container 12. The sensor 26 is connected in the vicinity of a target full line of the container 12 at which the container 12 is considered full. The sensor 26 is typically centered with respect to the target full line. The sensor 26 may include an indicator light that comes on when the container 12 is full (not shown).

In operation, the mode switch 50 of the controller 30 is turned on and switched to the PUMP mode. In the PUMP mode, the controller 30 directs the flow regulating devices 22, 24 to flow the beverages to the container 12, 14 to fill the containers 12, 14. Typically, the mode switch 50 is switched from the PUMP mode to the OFF position when the beverages covers the stirring units 64, although the mode switch 50 may be switched off after the beverages substantially reach the full lines of the containers 12, 14. The cooling device 60 is turned on to cool the beverages to the desired temperature and consistency. The mode switch 50 is then set to the AUTO mode.

In the AUTO mode, the controller 30 controls operation of the flow regulating devices 22, 24 in response to the sensor signals received from the sensors 26, 28. In one embodiment, the controller 30 automatically directs the flow regulating devices 22, 24 to terminate the flow of the beverage to the containers 12, 14 when the sensor signals indicate that the levels of the beverage in the containers 12, 14 have reached preset maximum levels. The preset maximum levels may be identical to or slightly above the full lines of the containers 12, 14. The controller 30 automatically reactivates the flow regulating devices 22, 24 to resume the flow of the beverages to the containers 12, 14 when the sensor signals indicate that the levels of the beverages in the containers 12, 14 have fallen to preset minimum levels.

To prevent flowing the beverages to the containers 12, 14 at an unacceptably high rate that would ruin the consistency of the frozen beverages, the flow rates of the beverages are kept below maximum allowable flow rates. The maximum allowable flow rate for each container 12, 14 is determined by the cooling capacity of the cooling device 60 and the ambient temperature. Empirical data can be obtained by conducting experiments to obtain maximum allowable flow rates for different cooling capacity values and ambient temperatures, so that the frozen beverage stays within a desired range of consistency. The empirical data can then be used to tune the controller 30 for particular operating conditions. The system 10, when properly tuned to match the cooling capacity of the cooling device 60 and the maximum allowable flow rates, will maintain the desired consistency of frozen beverages, while automatically refilling the beverage containers 12, 14 to within a desired range of levels.

Figure 3:
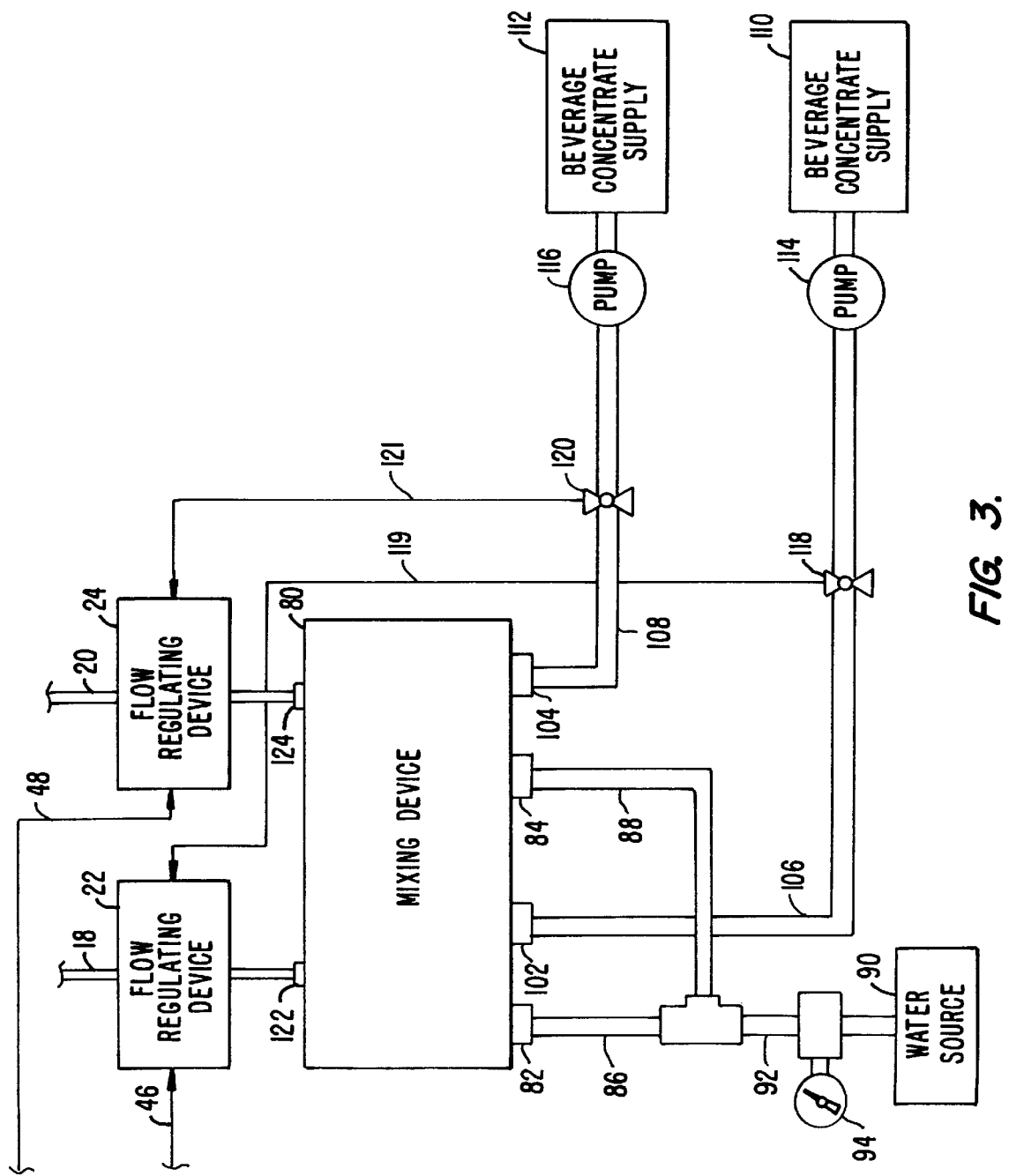
FIG. 3 is a block diagram schematically illustrating a beverage mixing system in accordance with an embodiment of the present invention.

FIG. 3 shows a beverage mixing system having a mixing device 80 for mixing beverages and supplying the mixed beverages to the flow regulating devices 22, 24 (as a specific embodiment of the beverage supplies 16, 17 of FIG. 1). Of course, two separate mixing devices may be used, but a single two-product mixing device 80 is often more efficient and cost-effective. The mixing device 80 has water inlets 82, 84 coupled, respectively, to water lines 86, 88 for receiving water from a water source 90. The water is typically filtered. Other diluting fluids may also be used instead. The water lines 86, 88 are coupled to a main water line 92. A water pressure regulator 92 is coupled with the main water line 92 for regulating the water pressure in the main water line 92. The water pressure regulator 92 typically is set to maintain the water pressure generally at a fixed pressure (e.g., about 30 psi) for normal operation.

The mixing device 80 has beverage concentrate inlets 102, 104 coupled, respectively, with beverage concentrate lines 106, 108 for receiving beverage concentrates from beverage concentrate supplies 110, 112, respectively. Pumps 114, 116 are typically provided in the beverage concentrate lines 106, 108, respectively, for pumping the concentrate from the beverage concentrate supplies 110, 112. Switches 118, 120 are coupled, respectively, with the beverage concentrate lines 106, 108 for monitoring the flow of the beverage concentrates to the mixing device 80. In the embodiment shown, the switches 118, 120 are in-line pressure switches for monitoring the pressure of the flows of the beverage concentrates in the lines 106, 108. The pressure switches 118 or 120 may include a diaphragm on which the pressure of the flow acts. The deflection of the diaphragm is proportional to the pressure. The diaphragm may be metallic or nonmetallic. The switches 118, 120 are coupled via wires 119, 121, respectively, to the flow regulating devices 22, 24 which are coupled to the outlets 122, 124 of the mixing device 80. The flow regulating devices 22, 24 are typically solenoids that are electrically coupled via the wires 119, 121, respectively, to the switches 118, 120.

The switches 118, 120 control the flow regulating devices 22, 24 to regulate the flow of beverages out of the mixing device 80 in response to the monitored flows of the beverage concentrates in the lines 106, 108, respectively. In this embodiment, when the pressure sensed by the pressure switch 118 falls below a preset minimum pressure (typically about 20–30 psi), indicating that the beverage concentrate supply 110 needs replacement, the switch 118 shuts the flow regulating device 22 to the flow of the first beverage out of the mixing device 80 from the outlet 122. Similarly, when the pressure sensed by the pressure switch 120 falls below a preset minimum pressure (typically about 20–30 psi), the switch 120 shuts the flow regulating device 24 to the flow of the second beverage out of the mixing device 80 from the outlet 124. By blocking the flow of beverages out of the mixing device 80, the switches 118, 120 in essence shut down automatically the mixing operation and prevent beverages of improper mixing ratios to flow to the dispensing system, such as the frozen beverage dispensing system 10 of FIG. 1, thereby avoiding damage to the equipment. The switch 118 or 120 desirably produces an audible and/or a visible signal indicating the shut down so that the empty beverage concentrate supply 110 or 112 can be promptly replaced.

After replacement of an empty beverage concentrate supply 110 or 112, the pressure in the beverage concentrate line 106 or 108 builds back up. When the pressure switch 114 or 116 senses a pressure that rises to or above the preset minimum pressure, it sends a signal to the flow regulating device 22 or 24 to open up the flow of the beverage from the outlet 122 or 124 of the mixing device 80. Of course, other ways of monitoring the flow of the beverage concentrates to detect a low flow situation and shutting off the flow of beverages out of the mixing device 80 may be employed.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A system for preparing a beverage from a beverage concentrate, the system comprising:

a mixing device having a beverage concentrate inlet coupled with a beverage concentrate line for receiving a beverage concentrate, a water inlet coupled with a water line for receiving water, and an outlet, the mixing device mixing the beverage concentrate and the water to produce a beverage for dispensing through the outlet;

a flow regulating device coupled to and disposed downstream of the outlet of the mixing device to regulate the flow of the beverage from the mixing device; and a pressure switch coupled to the beverage concentrate line for sensing a pressure in the beverage concentrate line, the pressure switch being coupled with the flow regulating device downstream of the mixing device for closing the flow regulating device to the flow of beverage from the mixing device when the sensed pressure in the beverage concentrate line falls below a preset minimum pressure.

2. The system of claim 1 wherein the flow regulating device comprises a solenoid.

3. The system of claim 1 wherein the pressure switch is disposed in-line with the beverage concentrate line.

4. The system of claim 3 wherein the pressure switch comprises a diaphragm switch.

5. The system of claim 1 wherein the pressure switch is electrically coupled with the flow regulating device to electrically deactivate the flow regulating device when the sensed pressure in the beverage concentrate line falls below a preset minimum pressure.

6. The system of claim 1 wherein the pressure switch opens the flow regulating device to the flow of the beverage from the mixing device when the sensed pressure in the beverage concentrate line rises to or above the preset minimum pressure.

7. The system of claim 1 further comprising a water pressure regulator coupled with the water line for regulating the water pressure in the water line.

8. The system of claim 1 further comprising a cooling unit coupled with the outlet of the mixing device for receiving the beverage from the mixing device, the cooling unit cooling the beverage to at least partially freeze the beverage received therein.

9. A system for preparing a beverage from a beverage concentrate, the system comprising:
   a mixing device having a beverage concentrate inlet coupled with a beverage concentrate line for receiving a beverage concentrate, a water inlet coupled with a water line for receiving water, and an outlet, the mixing device mixing the beverage concentrate and the water to produce a beverage for dispensing through the outlet;
   a flow regulating device coupled to the outlet of the mixing device to regulate the flow of the beverage from the mixing device;
   a pressure switch coupled to the beverage concentrate line for sensing a pressure in the beverage concentrate line, the pressure switch being coupled with the flow regulating device for closing the flow regulating device to the flow of beverage from the mixing device when the sensed pressure in the beverage concentrate line falls below a preset minimum pressure; and
   a cooling unit coupled with the outlet of the mixing device for receiving the beverage from the mixing device, the cooling unit cooling the beverage to at least partially freeze the beverage received therein,
   wherein the cooling unit has a cooling capacity and comprises a container; a sensor coupled with the container for sensing a level of the beverage in the container; and a controller coupled with the sensor for receiving a sensor signal indicating the level of the beverage in the container, the controller coupled with the flow regulating device for controlling the flow regulating device to regulate the flow rate of the beverage delivered to the container in response to the sensor signal received from the sensor and the cooling capacity of the cooling unit so as to maintain the at least partially frozen beverage in the container to within a desired range of consistency.

10. The system of claim 9 wherein the controller is configured to automatically direct the flow regulating device to terminate the flow of the beverage to the container when the sensor signal indicates that the level of the beverage in the container reaches a preset maximum level, and to reactivate the flow of the beverage to the container when the sensor signal indicates that the level of the beverage in the container falls to a preset minimum level.

11. The system of claim 9 wherein the controller is tuned to limit the flow rate of the beverage regulated by the flow regulating device for delivery to the container to a maximum allowable flow rate determined by the cooling capacity of the cooling device and ambient temperature to maintain the at least partially frozen beverage in the container to within the desired range of consistency.

12. The system of claim 9 wherein the controller includes a mode switch which has an override fill mode and an auto fill mode, the controller directing the flow regulating device to deliver the beverage to the container in the override fill mode, the controller controlling the flow regulating device to automatically maintain the level of the beverage in the container to within a preset level range in the auto fill mode.

13. A system for mixing and dispensing a beverage, the system comprising:
   a mixing device having a beverage concentrate inlet coupled with a beverage concentrate line for receiving a beverage concentrate, a fluid inlet coupled with a fluid line for receiving a diluting fluid, and an outlet, the mixing device mixing the beverage concentrate and the diluting fluid to produce a beverage for dispensing through the outlet;
   a cooling unit coupled with the outlet of the mixing device for receiving the beverage and cooling the beverage to at least partially freeze the beverage received therein;
   a flow regulating device coupled to and disposed downstream of the mixing device to regulate the flow of the beverage from the mixing device to the cooling unit; and
   means for sensing a pressure in the beverage concentrate line and. coupled with the flow regulating device downstream of the mixing device, for shutting off the flow of the beverage from the outlet of the mixing device to the cooling unit when the pressure in the beverage concentrate line falls below a preset minimum pressure.

14. The system of claim 13 further comprising a fluid pressure regulator coupled with the fluid line for regulating the pressure of the diluting fluid in the fluid line.

15. A system for mixing and dispensing a beverage, the system comprising:
   a mixing device having a beverage concentrate inlet coupled with a beverage concentrate line for receiving a beverage concentrate, a fluid inlet coupled with a fluid line for receiving a diluting fluid, and an outlet, the mixing device mixing the beverage concentrate and the diluting fluid to produce a beverage for dispensing through the outlet;
   a cooling unit coupled with the outlet of the mixing device for receiving the beverage and cooling the beverage to at least partially freeze the beverage received therein; and
   means for sensing a pressure in the beverage concentrate line and shutting off the flow of the beverage from the outlet to the cooling unit when the pressure in the beverage concentrate line falls below a preset minimum pressure,
   wherein the cooling unit has a cooling capacity and comprises a container, a sensor coupled with the container for sensing a level of the beverage in the container; and a controller coupled with the sensor for receiving a sensor signal indicating the level of the beverage in the container, the controller coupled with the flow regulating device for controlling the flow regulating device to regulate the flow rate of the beverage delivered to the container in response to the sensor signal received from the sensor and the cooling capacity of the cooling unit so as to maintain the at least partially frozen beverage in the container to within a desired range of consistency.

16. A method of automatically controlling the flow of a beverage produced in a mixing device, comprising the steps of:
   directing a flow of a beverage concentrate and a flow of water to the mixing device to be mixed therein to produce a mixed beverage for dispensing therefrom;

monitoring a pressure of the beverage concentrate in the flow of the beverage concentrate to the mixing device;

regulating the flow of the mixed beverage out from the mixing device in response to the monitored pressure of the beverage concentrate;

directing the flow of the mixed beverage to a container;

cooling the beverage in the container to at least partially freeze the beverage using a cooling device having a cooling capacity;

sensing a level of the beverage in the container; and adjusting a flow rate of the beverage to the container to maintain the level of the beverage in the container to within a preset level range, the flow rate of the beverage to the container being kept below a maximum allowable flow rate which is determined by the cooling capacity of the cooling device to maintain the at least partially frozen beverage in the container to within a desired range of consistency.

17. The method of claim 16 wherein the step of regulating comprises shutting off the flow of the mixed beverage out from the mixing device when the monitored pressure falls below a preset minimum pressure and opening the flow of the mixed beverage out from the mixing device when the monitored pressure rises to or above the preset minimum pressure.

18. The method of claim 16 herein the adjusting step comprises automatically terminating the flow of beverage to the container when the level of the beverage in the container reaches a preset maximum level and automatically reactivating the flow of the beverage to the container when the level of the beverage in the container falls to a preset minimum level.

19. The method of claim 16 further comprising the step of determining maximum allowable flow rates based on the cooling capacity of the cooling device and different ambient temperatures to maintain the at least partially frozen beverage in the container to within a desired range of consistency.

* * * * *